Jan. 7, 1958  R. GOUIRAND  2,819,094
PNEUMATIC SUSPENSION FOR VEHICLES
Filed Nov. 9, 1954
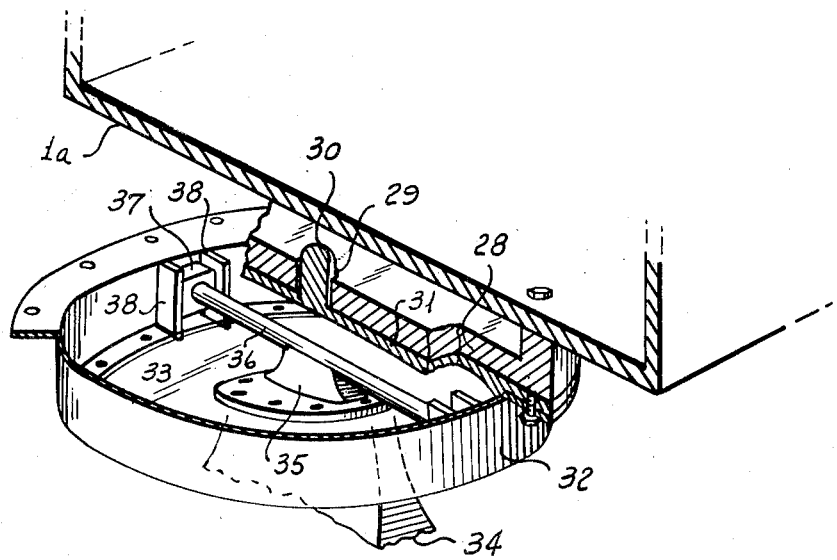
INVENTOR.
RENE GOUIRAND
BY
ATTORNEY

United States Patent Office 2,819,094
Patented Jan. 7, 1958

2,819,094
PNEUMATIC SUSPENSION FOR VEHICLES

Rene Gouirand, New York, N. Y.

Application November 9, 1954, Serial No. 467,684

5 Claims. (Cl. 280—115)

This invention is a pneumatic suspension for vehicles and may be used either in connection with road vehicles or railway rolling stock.

The primary object of the invention is to provide an unusually easy riding construction wherein the transmission of road shocks to the body of the vehicle is minimized.

Another object of the invention consists in the provision of novel and efficient traction means whereby the weight carrying member of the pneumatic element of the structure is relieved of longitudinal, transverse and twisting strains.

Features of the invention, other than those adverted to, will be apparent from the hereinafter detailed description and appended claims, when read in conjunction with the accompanying drawings.

The accompanying drawing illustrates a practical embodiment of the invention, but the construction therein shown is to be understood as illustrative, only, and not as defining the limits of the invention.

In the drawing is a fragmental perspective showing the manner in which the suspension of this invention may be incorporated in railway rolling stock or utilized as a fifth wheel of a tractor-trailer combination.

In the drawing, 1a indicates a car body or the forward end portion of a trailer. To the under side of this body is rigidly affixed a bearing frame 28, provided with a central opening 29 to form a bearing for the king pin 30 of a fifth wheel plate 31 adapted to bear against the under side of the bearing frame 28 and to rotate with respect to the latter about the axis of the king pin 30. To the periphery of the plate 31 is secured a depending skirt 32, shown as circular in form and attached to the plate 31 with an air-tight joint between them, so that the plate 31 and skirt 32 collectively form a receptacle corresponding to the receptacle 3, the interior of which constitutes the compressed air chamber. A diaphragm 33 extends across the open bottom of the skirt 32 and is peripherally secured to the skirt in a hermetically sealed joint of any appropriate kind. To the under side of the central portion of the diaphragm is secured a yoke 34 which corresponds to the yoke 10 of the preceding figures. For railway use, the wheels may be of the ordinary flanged type to cooperate with rolls, while for the tractor construction, the wheels may be of the usual rubber tired variety mounted on the frame of the tractor.

In the structure shown, the diaphragm is relieved of draft and braking stresses by mounting at the center of the diaphragm a bracket 35 which may be secured in place by the same bolts 12 which are used in the preceding figures for the attachment of the yoke to said diaphragm. This bracket 35 is rigid with a rod 36, extending transversely of the vehicle with its opposite ends projecting into blocks 37 of rubber or other resilient material. These blocks are mounted between upright guide flanges 38 rigid with the skirt 32. They serve to transmit draft and braking stresses from the body to the yoke, and vice versa, and at the same time cushion transverse forces which may be set due to change of direction of movement of the vehicle or by side sway. Blocks 37 are free for vertical sliding movement between the guide flanges 38 and thus permit a proper flexing of the diaphragm and enable it to perform the function of cushioning the body of the vehicle against road shocks encountered by the wheels.

The king pin 30 is shown as simply projecting through the bearing plate 28. This is satisfactory for railway construction as the weight of the body of the car will properly maintain it in position on the truck. However, for trailer use any suitable means may be provided to lock the king pin against withdrawal from its bearing in the plate 28.

The foregoing detailed description sets forth the invention in its preferred practical forms, but the invention is to be understood as fully commensurate with the appended claims.

Having thus fully described the invention, what I claim as new and desire to secure by Letters Patent is:

1. A pneumatic suspension comprising: a body, a pneumatic chamber mounted for pivotal movement on a vertical axis beneath the body and closed at its bottom by a diaphragm, a wheeled frame beneath the diaphragm and secured thereto, a transverse rod rigid with the wheeled frame and having shoes at its opposite ends, and upright guides rigid with the wall of the pneumatic chamber and cooperating with said shoes for relieving the diaphragm of draft and braking strains.

2. A vehicle comprising: a chassis frame, a wheeled cradle below said frame, a pneumatic chamber supported on said frame and having an elastic diaphragm secured to the cradle, and means within the pneumatic chamber for securing the cradle and frame to one another against relative movement longitudinally of the vehicle while permitting flexing of the diaphragm, said means for securing the cradle to the frame comprising trunnions carried by the cradle and cooperating with upright guides within the pneumatic chamber.

3. A pneumatic suspension comprising: a body part, a wheeled frame part beneath the body part, a rigid pneumatic chamber housing adapted to be secured to one of said parts and one horizontal side of which is closed by a flexible diaphragm secured to the other part, guides interiorly of and carried by the opposite sides of the pneumatic chamber housing, and a rigid member vertically slidable in said guides and mounted on the part to which the diaphragm is secured to relieve the diaphragm of draft and braking strains.

4. A pneumatic suspension comprising: a rigid housing having a peripheral wall and open at one side, a flexible diaphragm closing the open side, a load carrying portion secured to the central part of the diaphragm, guides carried by the opposite sides of the peripheral wall interiorly of the housing, and a rigid member secured to the load carrying portion and engaging with said guides to relieve the diaphragm from draft and braking strains while permitting flexing of said diaphragm.

5. A pneumatic suspension according to claim 4, wherein said rigid member is equipped with shoes having slidable engagement with said guides.

References Cited in the file of this patent

UNITED STATES PATENTS

| | | |
|---|---|---|
| 673,011 | Annable | Apr. 30, 1901 |
| 770,776 | Oviatt | Sept. 27, 1904 |
| 770,847 | Downer | Sept. 27, 1904 |
| 1,112,663 | Smith | Oct. 6, 1914 |
| 1,837,100 | Bell | Dec. 15, 1931 |
| 1,959,585 | Ingersoll | May 22, 1934 |
| 2,317,057 | Higby | Apr. 20, 1943 |
| 2,496,893 | Smith | Feb. 7, 1950 |
| 2,663,569 | Gouirand | Dec. 22, 1953 |
| 2,689,136 | Hendrickson | Sept. 14, 1954 |
| 2,733,931 | Reid | Feb. 7, 1956 |